US012650185B2

(12) United States Patent
Radoń et al.

(10) Patent No.: US 12,650,185 B2
(45) Date of Patent: Jun. 9, 2026

(54) NON ROTATING SPACER FOR GAS TURBINE ENGINE

(71) Applicant: Pratt & Whitney Canada Corp., Longueuil (CA)

(72) Inventors: Joanna Radoń, Rakszawa (PL); Filip Pulter, Rzeszów (PL); Aleksander Pelc, Rzeszów (PL); Grzegorz Ciasnocha, Mogielnica (PL)

(73) Assignee: PRATT & WHITNEY RZESZOW S.A., Województwo Podkarpackie (PL)

( * ) Notice: Subject to any disclaimer, the term of this patent is extended or adjusted under 35 U.S.C. 154(b) by 0 days.

(21) Appl. No.: 18/662,650

(22) Filed: May 13, 2024

(65) Prior Publication Data

US 2025/0347368 A1 Nov. 13, 2025

(51) Int. Cl.
*F16L 23/00* (2006.01)
*F01D 9/06* (2006.01)
(Continued)

(52) U.S. Cl.
CPC ........ *F16L 23/003* (2013.01); *F16C 33/6677* (2013.01); *F01D 9/065* (2013.01); *F01D 25/16* (2013.01); *F01D 25/162* (2013.01); *F01D 25/18* (2013.01); *F01D 25/183* (2013.01); *F01D 25/24* (2013.01); *F01D 25/243* (2013.01); *F01D 25/246* (2013.01); *F01D 25/28* (2013.01); *F05D 2230/64* (2013.01); *F05D 2240/63* (2013.01);
(Continued)

(58) Field of Classification Search
CPC .......... F01D 25/28; F01D 9/065; F01D 25/18; F01D 25/183; F01D 25/24; F01D 25/243;

F01D 25/246; F01D 25/16; F01D 25/162; F05D 2230/64; F05D 2260/36; F05D 2240/63; F16L 25/12; F16L 23/003; F16C 33/6659; F16C 33/6677; F16C 35/073; F16C 35/077
USPC .......................................................... 415/142
See application file for complete search history.

(56) References Cited

U.S. PATENT DOCUMENTS 3,316,035 A * 4/1967 Zuber ..................... F16C 17/04
384/127
5,564,903 A * 10/1996 Eccles ................... F16C 35/077
416/174
(Continued)

OTHER PUBLICATIONS

Extended European Search Report corresponding to EP Application No. 25176222.5; Issue date, Nov. 19, 2025, 8 pages.

*Primary Examiner* — Nathaniel E Wiehe
*Assistant Examiner* — Art Golik
(74) *Attorney, Agent, or Firm* — CANTOR COLBURN LLP

(57) ABSTRACT

A non-rotating spacer for use in a mating part of a gas turbine engine, including: a ring of material having a first contact surface and a second contact surface, the first contact surface being opposite to the second contact surface, the ring of material also having an inner ring surface and an outer ring surface; a pair of slots located in the first contact surface, the pair of slots extending from the inner ring surface to the outer ring surface, the pair of slots do not extend though to the second contact surface such that the pair of slots are defined by three surfaces of the ring of material; and at least one lug protruding radially outward from the outer ring surface, the at least one lug being located adjacent to one of the pair of slots.

10 Claims, 9 Drawing Sheets

(51) Int. Cl.

| | |
|---|---|
| *F01D 25/16* | (2006.01) |
| *F01D 25/18* | (2006.01) |
| *F01D 25/24* | (2006.01) |
| *F01D 25/28* | (2006.01) |
| *F16C 33/66* | (2006.01) |
| *F16C 35/073* | (2006.01) |
| *F16C 35/077* | (2006.01) |
| *F16L 25/12* | (2006.01) |

(52) U.S. Cl.
CPC ...... *F05D 2260/36* (2013.01); *F16C 33/6659* (2013.01); *F16C 35/073* (2013.01); *F16C 35/077* (2013.01); *F16L 25/12* (2013.01)

(56) References Cited

U.S. PATENT DOCUMENTS

| | | | | |
|---|---|---|---|---|
| 5,738,356 | A | 4/1998 | Marshall | |
| 8,337,090 | B2 * | 12/2012 | Herborth | F16C 27/045 |
| | | | | 384/582 |
| 10,519,803 | B2 * | 12/2019 | Bastani | F16C 17/107 |
| 10,669,875 | B2 * | 6/2020 | Hernandez | F04D 29/321 |
| 10,934,846 | B2 | 3/2021 | Oudin et al. | |
| 11,378,214 | B2 * | 7/2022 | Wolf | F16L 3/1222 |
| 11,994,198 | B1 * | 5/2024 | Zueski | F16H 57/037 |
| 2008/0098735 | A1 * | 5/2008 | Gutknecht | F01D 25/166 |
| | | | | 60/605.1 |
| 2019/0301481 | A1 * | 10/2019 | Colont | F04D 29/051 |
| 2019/0376560 | A1 * | 12/2019 | Colont | F16C 35/042 |
| 2022/0364602 | A1 | 11/2022 | Babu | |
| 2025/0179997 | A1 * | 6/2025 | König | F03D 15/20 |

* cited by examiner

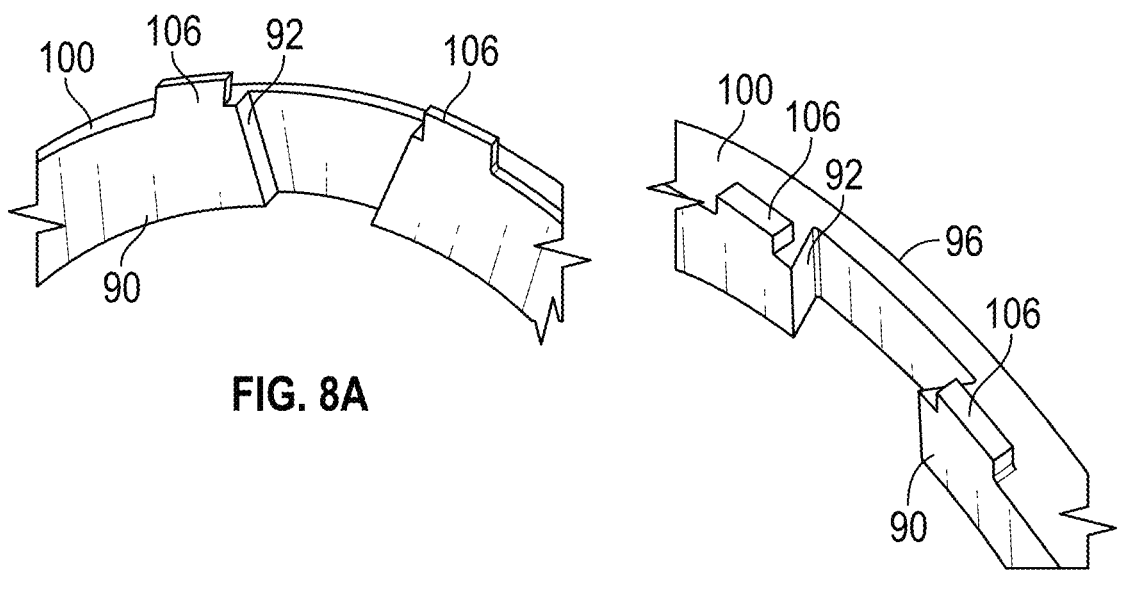
FIG. 8A
FIG. 8B
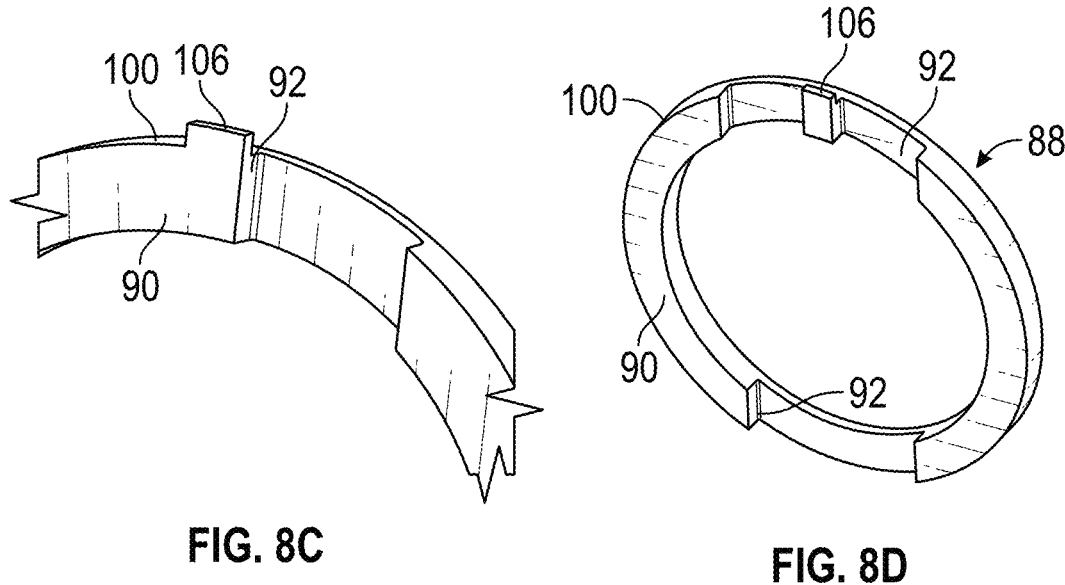
FIG. 8C
FIG. 8D

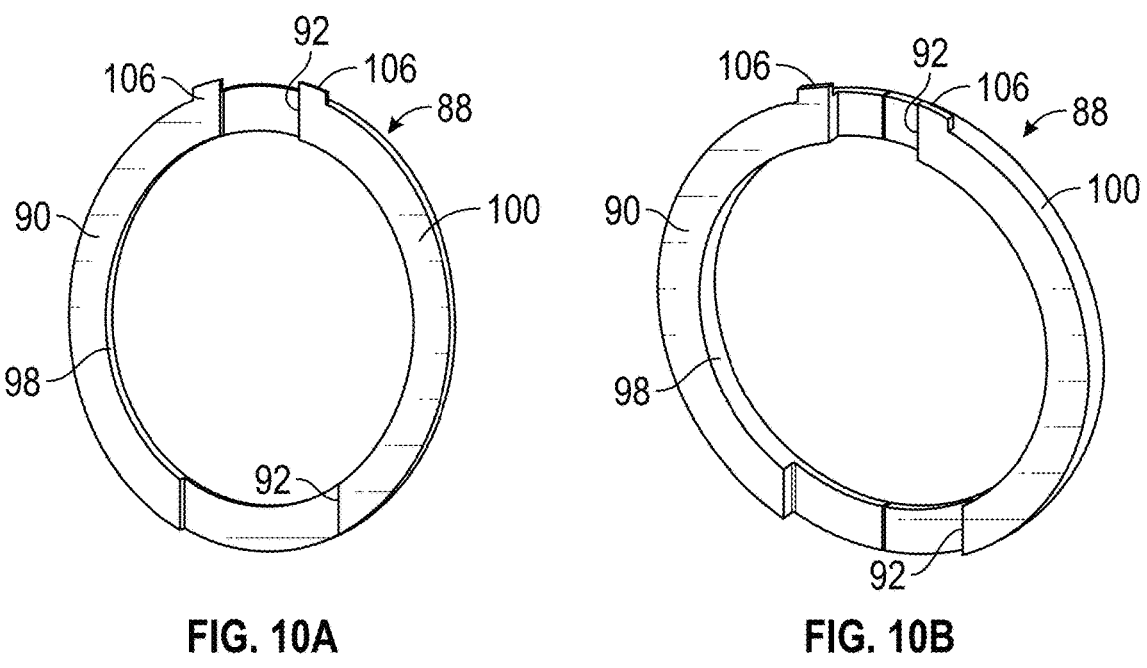
FIG. 10A              FIG. 10B
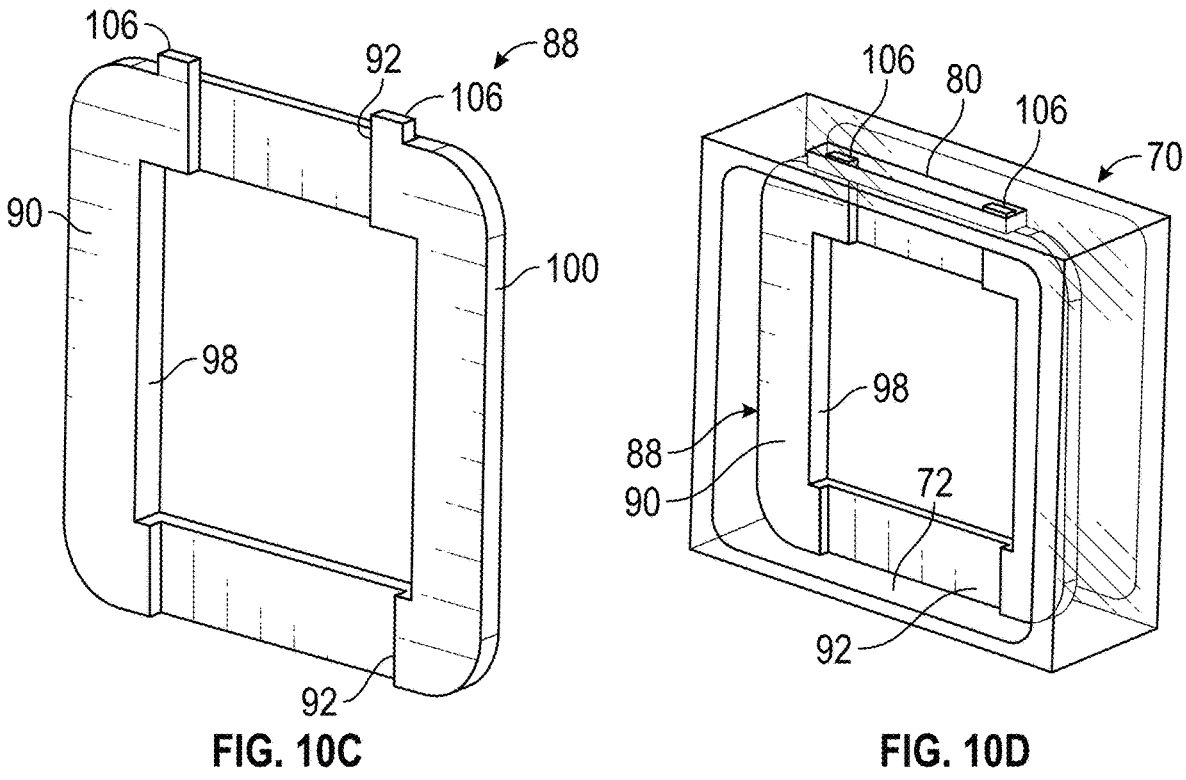
FIG. 10C              FIG. 10D

NON ROTATING SPACER FOR GAS TURBINE ENGINE

BACKGROUND

This disclosure relates to a non-rotating spacer for maintaining a cavity between two joined parts.

Mating parts are used for joining at least one part. In some applications at least one part that is joined together with the mating part must be axially separated from the mating part in order to allow for fluid communication between at least one cavity located between axial ends of the parts secured together.

As such, it is desirable to provide an apparatus for mating an axial space between two parts secured to each other.

BRIEF DESCRIPTION

Disclosed is a non-rotating spacer for use in a mating part, including: a ring of material having a first contact surface and a second contact surface, the first contact surface being opposite to the second contact surface, the ring of material also having an inner ring surface and an outer ring surface; a pair of slots located in the first contact surface, the pair of slots extending from the inner ring surface to the outer ring surface, the pair of slots do not extend though to the second contact surface such that the pair of slots are defined by three surfaces of the ring of material; and at least one lug protruding radially outward from the outer ring surface, the at least one lug being located adjacent to one of the pair of slots.

In addition to one or more of the features described above, or as an alternative to any of the foregoing embodiments, the at least one lug is a pair of lugs disposed on opposite sides of one the pair of slots.

In addition to one or more of the features described above, or as an alternative to any of the foregoing embodiments, the pair of lugs are rounded.

In addition to one or more of the features described above, or as an alternative to any of the foregoing embodiments, the pair of slots are located 180 degrees from each other.

In addition to one or more of the features described above, or as an alternative to any of the foregoing embodiments, the pair of slots each have a width, the width of each one of the pair of slots being equal.

In addition to one or more of the features described above, or as an alternative to any of the foregoing embodiments, one of the pair of slots has a width that is not equal to a width of the other one of the pair of slots.

In addition to one or more of the features described above, or as an alternative to any of the foregoing embodiments, the pair of slots are symmetrical.

In addition to one or more of the features described above, or as an alternative to any of the foregoing embodiments, a third slot in the first contact surface, the third slot extending from the inner ring surface to the outer ring surface, the third slot does not extend though to the second contact surface such that the third slot is defined by three surfaces of the ring of material.

In addition to one or more of the features described above, or as an alternative to any of the foregoing embodiments, the non-rotating spacer is formed from two separate pieces of material secured together.

In addition to one or more of the features described above, or as an alternative to any of the foregoing embodiments, the mating part is configured for use in a gas turbine engine.

Also disclosed is a non-rotating spacer and a mating part, the mating part configured to keep a first part axially spaced from a surface of the mating part, the mating part including: a first inner periphery and a second inner periphery, the first inner periphery having a larger perimeter than the second inner periphery; a contact surface extending radially inward from the first inner periphery and transitions into the second inner periphery; a pair of openings located in the first inner periphery; a non-rotating spacer configured to be inserted into the first inner periphery, the non-rotating spacer including: a perimeter of material having a first contact surface and a second contact surface, the first contact surface being opposite to the second contact surface, the perimeter of material also having an inner surface and an outer surface; a pair of slots located in the first contact surface, the pair of slots extending from the inner surface to the outer surface, the pair of slots do not extend through to the second contact surface such that the pair of slots are defined by three surfaces of the perimeter of material; and at least one lug protruding radially outward from the outer surface, the at least one lug being located adjacent to one of the pair of slots; and wherein the at least one lug is received within one of the pair of openings when the non-rotating spacer is located within the first inner periphery and the pair of slots provide fluid communication from the inner surface to the pair of openings when the non-rotating spacer is located within the first inner periphery and the at least one lug prevents rotation of the non-rotating spacer when the non-rotating spacer is located within the first inner periphery.

In addition to one or more of the features described above, or as an alternative to any of the foregoing embodiments, a recess extends from the contact surface to the second inner periphery.

In addition to one or more of the features described above, or as an alternative to any of the foregoing embodiments, the pair of openings are elongated oval openings.

In addition to one or more of the features described above, or as an alternative to any of the foregoing embodiments, the pair of openings are located 180 degrees from each other.

In addition to one or more of the features described above, or as an alternative to any of the foregoing embodiments, the pair of openings extend partially into the contact surface of the mating part to create a recess in the contact surface of the mating part.

In addition to one or more of the features described above, or as an alternative to any of the foregoing embodiments, the at least one lug is a pair of lugs disposed on opposite sides of one the pair of slots and the perimeter of material is a ring of material and the outer surface of the ring of material has a diameter that is less than a diameter of the first inner periphery such that the non-rotating spacer is easily inserted into the first inner periphery and the first contact surface of the non-rotating spacer makes contact with the contact surface of the mating part when the non-rotating spacer is inserted into the first inner periphery.

In addition to one or more of the features described above, or as an alternative to any of the foregoing embodiments, the pair of slots each have a width, the width of each one of the pair of slots being equal.

In addition to one or more of the features described above, or as an alternative to any of the foregoing embodiments, a third slot in the first contact surface, the third slot extending from the inner surface to the outer surface, the third slot does not extend though to the second contact surface such that the third slot is defined by three surfaces of the perimeter of material.

In addition to one or more of the features described above, or as an alternative to any of the foregoing embodiments, the first inner periphery and the perimeter of material of the non-rotating spacer are rectangular or square.

In addition to one or more of the features described above, or as an alternative to any of the foregoing embodiments, the mating part is configured for use in a gas turbine engine.

Also disclosed is a non-rotating spacer and a mating part, the mating part configured to keep a first part axially spaced from a surface of the mating, the mating part including: a first inner periphery and a second inner periphery, the first inner periphery being larger than the second inner periphery; a contact surface extending radially inward from the first inner periphery and transitions into the second inner periphery; a pair of openings located in the first inner periphery; a non-rotating spacer configured to be inserted into the first inner periphery, the non-rotating spacer including: a perimeter of material having a first contact surface and a second contact surface, the first contact surface being opposite to the second contact surface, the perimeter of material also having an inner surface and an outer surface; a pair of slots located in the first contact surface, the pair of slots extending from the inner surface to the outer surface, the pair of slots do not extend though to the second contact surface such that the pair of slots are defined by three surfaces of the perimeter of material; and at least one lug protruding radially outward from the outer surface, the at least one lug being located adjacent to one of the pair of slots; and wherein the at least one lug is received within one of the pair of openings when the non-rotating spacer is located within the first inner periphery and the pair of slots provide fluid communication from the inner surface to the pair of openings when the non-rotating spacer is located within the first inner periphery and the configuration of non-rotating spacer prevents rotation of the non-rotating spacer when the non-rotating spacer is located within the first inner periphery.

In addition to one or more of the features described above, or as an alternative to any of the foregoing embodiments, the at least one lug is a pair of lugs disposed on opposite sides of one the pair of slots.

In addition to one or more of the features described above, or as an alternative to any of the foregoing embodiments, the mating part is configured for use in a gas turbine engine.

Also disclosed is method of maintaining an axial space between a first part and a mating into which the first part is inserted, including: manually inserting without any tools a non-rotating spacer into the mating part, the non-rotating spacer configured to keep the first part axially spaced from a contact surface of the mating part, the mating part including: a first inner periphery and a second inner periphery, the first inner periphery having a larger perimeter than the second inner periphery; the contact surface extending radially inward from the first inner periphery and transitions into the second inner periphery; a pair of openings located in the first inner periphery, the non-rotating spacer comprising: a perimeter of material having a first contact surface and a second contact surface, the first contact surface being opposite to the second contact surface, the perimeter of material also having an inner surface and an outer surface; a pair of slots located in the first contact surface, the pair of slots extending from the inner surface to the outer surface, the pair of slots do not extend though to the second contact surface such that the pair of slots are defined by three surfaces of the perimeter of material; and at least one lug protruding radially outward from the outer surface, the at least one lug being located adjacent to one of the pair of slots; and wherein the at least one lug is received within one of the pair of openings when the non-rotating spacer is located within the first inner periphery and the pair of slots provide fluid communication from the inner surface to the pair of openings when the non-rotating spacer is manually inserted within the first inner periphery and the at least one lug prevents rotation of the non-rotating spacer when the non-rotating spacer is manually inserted within the first inner periphery.

In addition to one or more of the features described above, or as an alternative to any of the foregoing embodiments, the mating part is configured for use in a gas turbine engine.

BRIEF DESCRIPTION OF THE DRAWINGS

The following descriptions should not be considered limiting in any way. With reference to the accompanying drawings, like elements are numbered alike:

FIGS. 8A-8C are partial views of alternative non-rotating spacers in accordance with the present disclosure;

FIG. 8D is a perspective view of an alternative non-rotating spacer in accordance with the present disclosure;

FIGS. 9A-10B are perspective views of alternative non-rotating spacers in accordance with the present disclosure;

FIG. 10C is a perspective view of an alternative non-rotating spacer in accordance with the present disclosure; and FIG. 10D is a perspective view of a mating part and a non-rotating spacer in accordance with an alternative embodiment of the present disclosure.

DETAILED DESCRIPTION

A detailed description of one or more embodiments of the disclosed apparatus and method are presented herein by way of exemplification and not limitation with reference to the FIGS.

Figure 1:
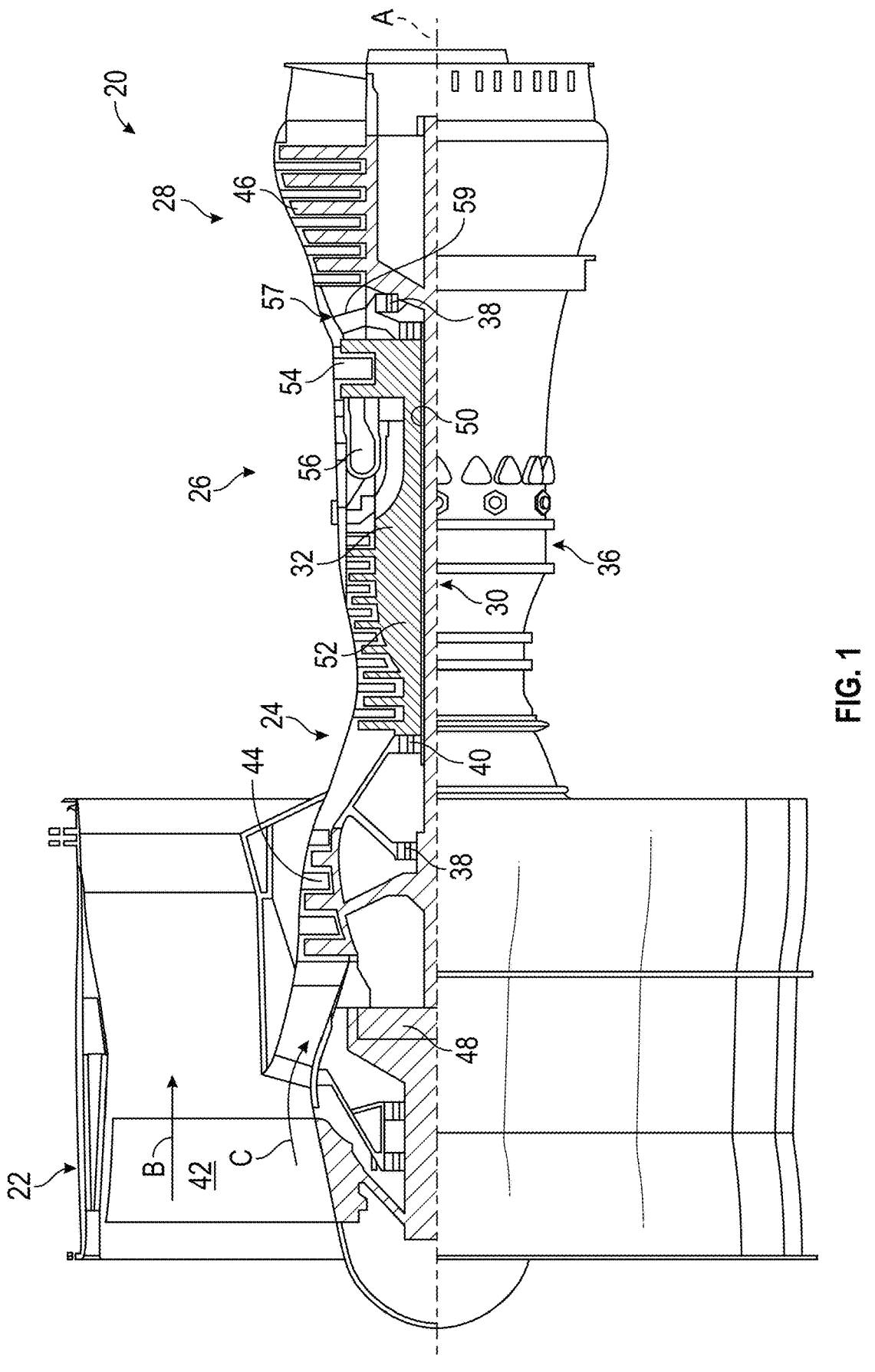
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to any other type of engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example. The geared architecture 48 may be an epicycle gear train, such as a planetary gear system or other gear system, with a gear reduction ratio. It should be understood, however, that the above parameters are only exemplary of one embodiment of a geared architecture engine and that the present disclosure is applicable to other gas turbine engines including direct drive turbofans and other engines not having a gear system 48.

Figure 2A:
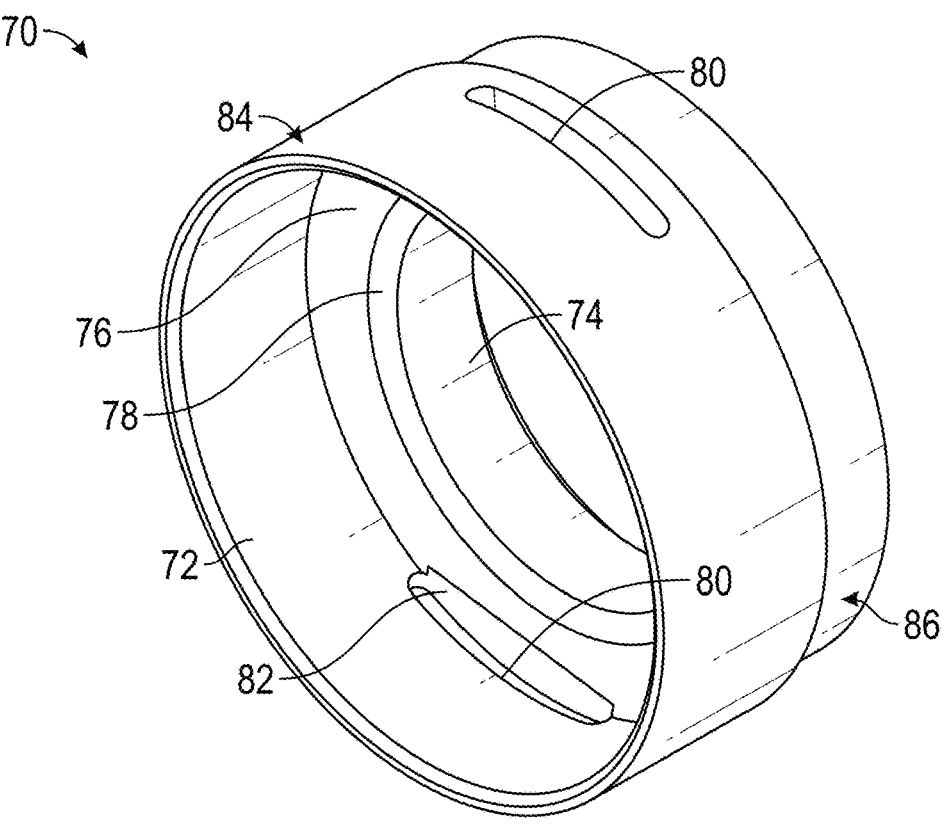
FIG. 2A is a perspective view of a mating part in accordance with the present disclosure.
Figure 2B:
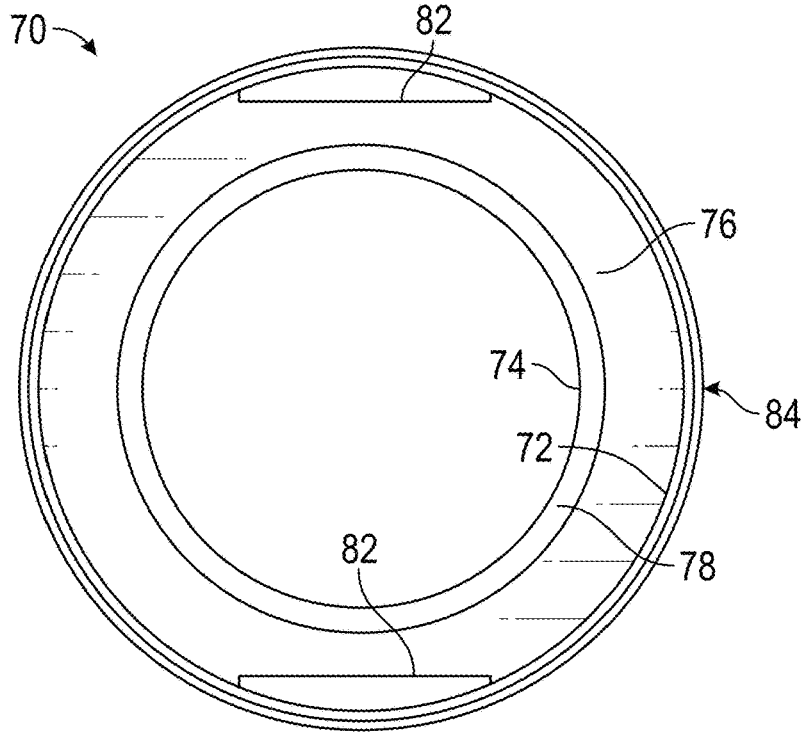
FIG. 2B is an end view of a mating part in accordance with the present disclosure.

Referring now to FIGS. 2A and 2B, a mating part 70 in accordance with the present disclosure is illustrated. The mating part 70 may be located proximate to the bearing systems 38 in order to assist with supply of fluids to the bearing systems 38. Of course, other locations within the gas turbine engine 20 are contemplated to be within the scope of the present disclosure. Still further, the mating part can be used in any application where there is a desire to provide an axial space between two parts that are joined together. As such, various embodiments of the present disclosure while applicable to gas turbine engines or any engines may also be applicable to a non-engine application where there is a need to provide an axial space between at least one part that is joined together by the mating part 70. The mating part 70 has a circular configuration with a first inner periphery 72 and a second inner periphery 74. The first inner periphery having a larger diameter than the second inner periphery 74. A contact surface 76 extends radially inward from the first inner periphery 72 and transitions into the second inner periphery 74. A step or recess 78 may extend from the contact surface 76 to the second inner periphery 74. The mating part 70 has a pair of elongated oval openings 80 that are located 180 degrees with respect to each other in the first inner periphery 72. Of course, the pair of oval openings or openings 80 may be located at other arrangements with respect to 180 degrees. As illustrated, the oval openings or openings 80 extend partially into the contact surface 76 such that there is a mismatch or recess 82 in the contact surface 76. Still further and while oval openings 80 are mentioned it is understood that any shaped opening (e.g., rectangular, circular, etc.) may be employed in accordance with the present disclosure.

As illustrated, the mating part 70 has a first circular portion 84 that defines the first inner periphery 72 and a second circular portion 86 that defines the second inner periphery 74.

Figure 3:
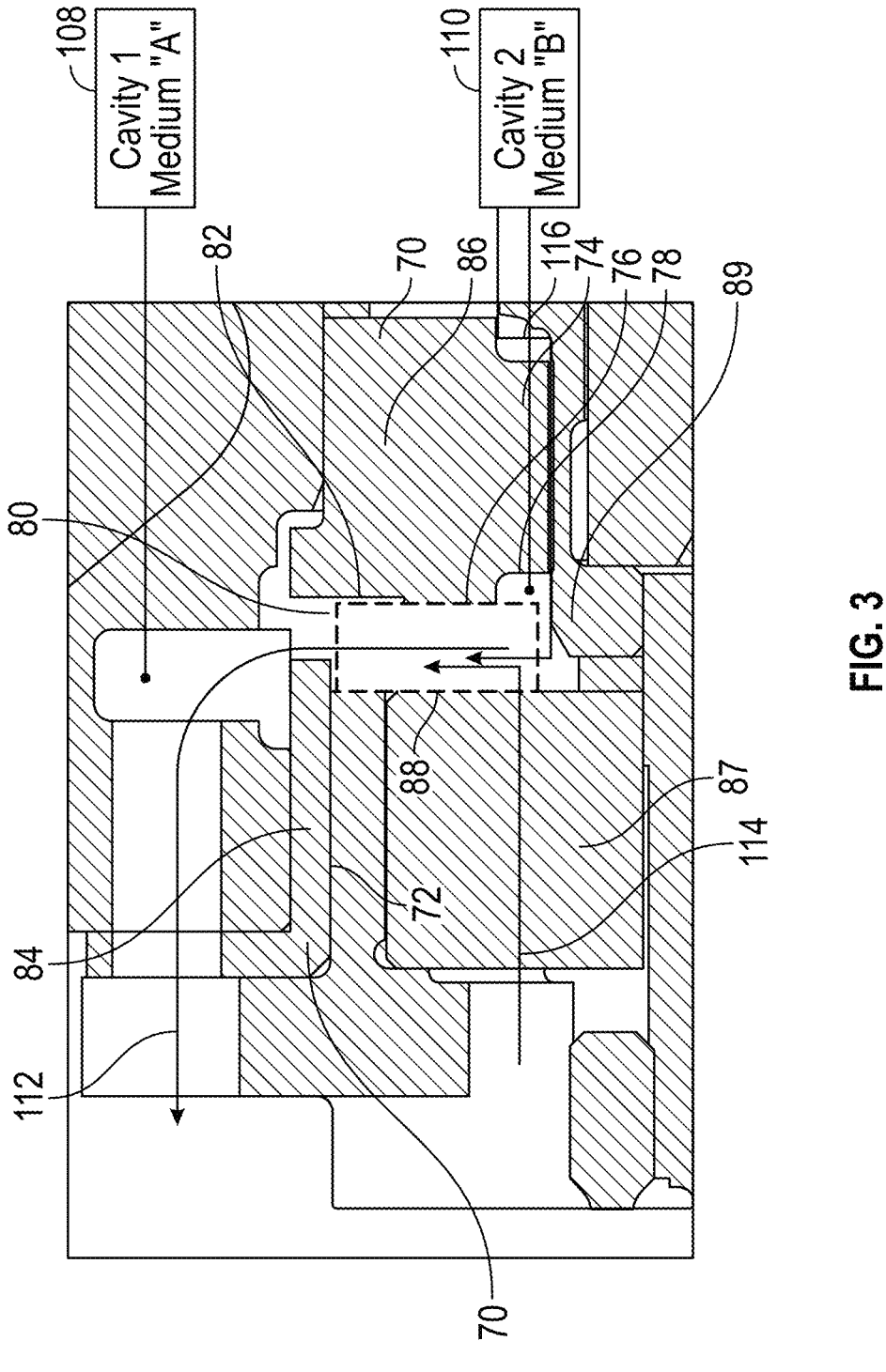
FIG. 3 is a partial cross-sectional view of a portion of the mating part with a non-rotating spacer in accordance with the present disclosure.

FIG. 3 is a partial cross-sectional view of a portion of the mating part 70 with a non-rotating spacer 88 in accordance with the present disclosure. The non-rotating spacer 88 is used to keep a first part 87 axially spaced from the contact surface 76 of the mating part 70. The axial distance between the first part 87 and the contact surface 76 of the mating part 70 has to be optimized to reduce the parts (70 and 87) axial tolerance variation. The anti-rotating function and openings between cavities still allows for manufacturing of a simplified spacer geometry while utilizing it to provide the required axial space between these two parts 70 and 87. Moreover, the non-rotating spacer 88 can be made with a required or optimized or classified thickness.

Also shown is a second part 89 which may be inserted into an opposite side of the mating part 70. In one non-limiting embodiment the non-rotating spacer 88 also provides a means for mating an axial space between the first part 87 and the second part 89. Alternatively, and in other applications, the non-rotating spacer 88 may only be required for keeping the first part 87 axially spaced from the contact surface 76 of the mating part 70.

Figures 4, 5:
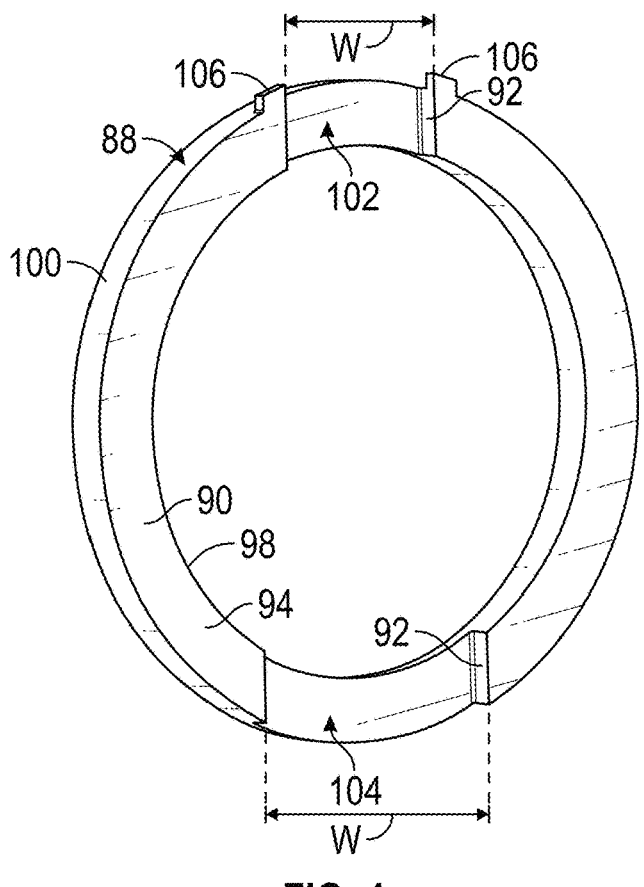
FIG. 4 is a perspective view of a non-rotating spacer in accordance with the present disclosure.
FIG. 5 is a perspective view of a mating part and a non-rotating spacer in accordance with the present disclosure.

As illustrated in FIG. 4, the non-rotating spacer 88 is a perspective view of a non-rotating spacer in accordance with the present disclosure. The non-rotating spacer 88 in one embodiment has a ring of material 90. The ring of material 90 has a pair of slots 92 that are configured to align with the openings 80 when the non-rotating spacer 88 is inserted into the first inner periphery 72. The pair of slots 92 extend partially into a first contact surface 94 but not completely through the ring of material 90 of the non-rotating spacer 88 such that the pair of slots are defined by three surfaces of the ring of material 90. The first contact surface 94 being opposite to a second contact surface 96 of the non-rotating spacer 88. The pair of slots 92 extending from an inner ring surface 98 to an outer ring surface 100 of the ring of material 90 of the non-rotating spacer 88. The pair of slots 92 may be referred to as an upper slot 102 and a lower slot 104. In one embodiment, the pair of slots have similar widths "W" or dissimilar widths "W". In one embodiment, the lower slot 104 has a larger width than the upper slot 102.

Protruding radially outward from the outer ring surface 100 is a pair of lugs or tabs 106. The pair of lugs or tabs 106 being located adjacent to the upper slot 102 and configured to be received within opening 80 when the non-rotating spacer 88 is inserted into the first inner periphery 72. The pair of lugs or tabs 106 extend radially from the outer ring surface 100 to a height that prevents rotation of the non-rotating spacer 88 when it is inserted into the first inner periphery 72.

In one non-limiting embodiment, the pair of lugs or tabs 106 are integrally formed with the ring of material 90. As used herein, "integrally formed" is intended to cover a single unitary structure. In other words, the single unitary structure is not capable of being disassembled without cutting or destruction of the single unitary structure.

The outer ring surface 100 of the ring of material has a diameter that is slightly less than a diameter of the first inner periphery 72 such that the non-rotating spacer 88 is easily inserted into the first inner periphery 72 (illustrated in FIG. 5). In addition, the diameter of the outer ring surface 100 is large enough such that the non-rotating spacer 88 is easily inserted into the first inner periphery 72 but the outer ring surface is in close proximity to the first inner periphery 72.

Figure 6C:
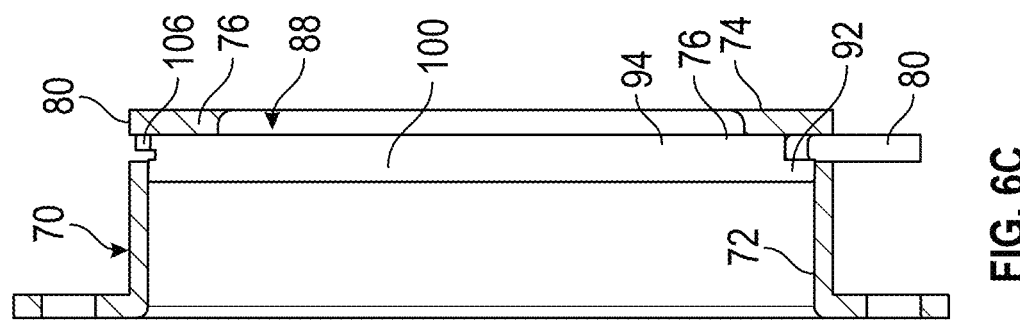
FIG. 6A-6C are views illustrating the non-rotating spacer being inserted into a mating part in accordance with the present disclosure.
Figure 6B:
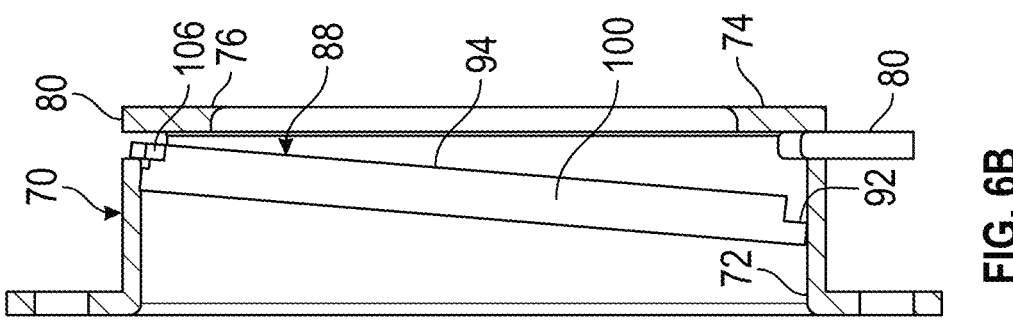
Figure 6A:
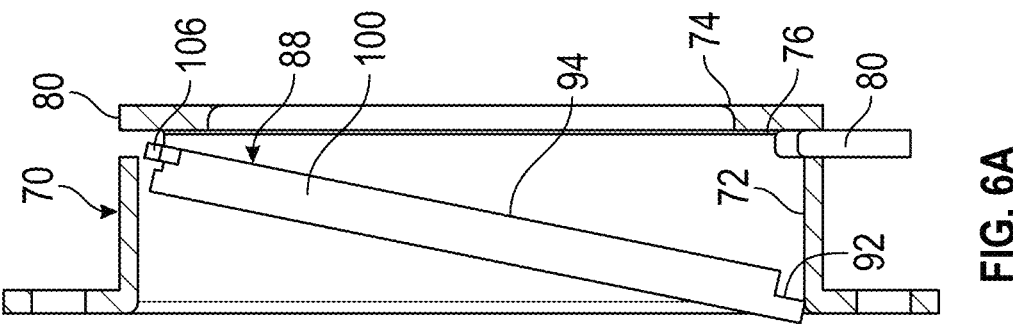

FIG. 6A-6C are views illustrating the non-rotating spacer 88 being inserted into the mating part 70. As the non-rotating spacer 88 is inserted into the first inner periphery 72 the pair of lugs 106 are inserted into one of the pair of openings 80 and the non-rotating spacer 88 is pivoted inwardly until the first contact surface 94 comes into contact with the contact surface 76 the upper opening. The non-rotating spacer 88 when in the position illustrated in FIG. 6C maintains parts 87 and 70 axially separated from each other however the slots 92 and openings 80 allow a first cavity 108 to be in fluid communication with a second cavity 110. As used herein fluid communication is intended to cover liquids, gases and combinations thereof. The first cavity 108 containing a first medium and the second cavity 110 containing a second medium. The connection path between the first cavity 108 and the second cavity 110 being illustrated by arrows 112, 114 and 116. The pair of lugs or tabs 106 when inserted into one of the pair of openings 80 prevent rotation of the non-rotating spacer 88 in the direction of arrows 118 and 120. In addition, the pair of lugs or tabs 106 when inserted into one of the pair of openings 80 properly locate the non-rotating spacer 88 in the mating part 70 so that the pair of openings 80 are aligned with the slots 92 in order to provide the desired fluid flow. In other words, the openings 80, slots 92 and lugs or tabs 106 are positioned so that the non-rotating spacer 88 cannot be fully inserted into the mating part 70 unless the pair of lugs or tabs 106 are inserted into one of the pair of openings 80 to prevent rotation of the non-rotating spacer 88 in the direction of arrows 118 and 120.

Figure 7A:
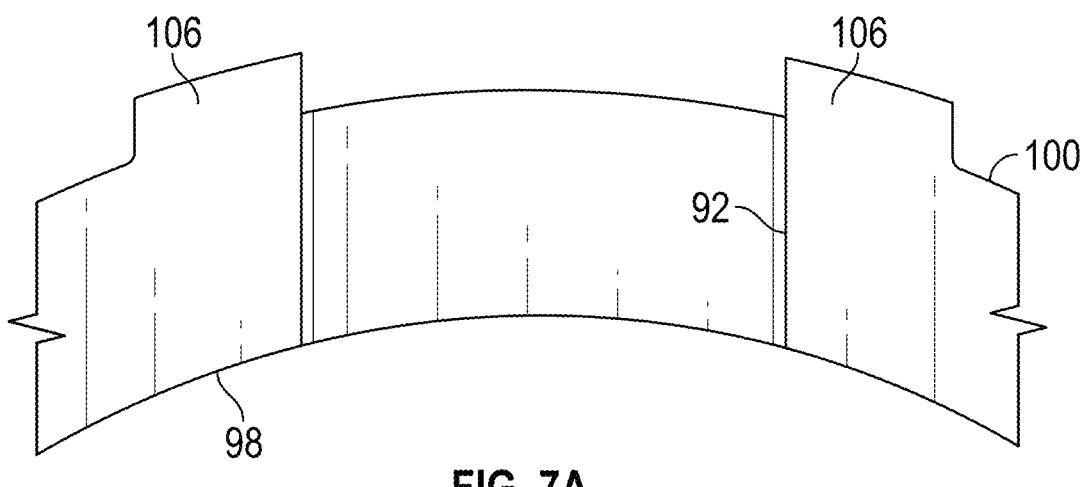
FIGS. 7A-7C are partial views of alternative non-rotating spacers in accordance with the present disclosure.
Figure 7B:
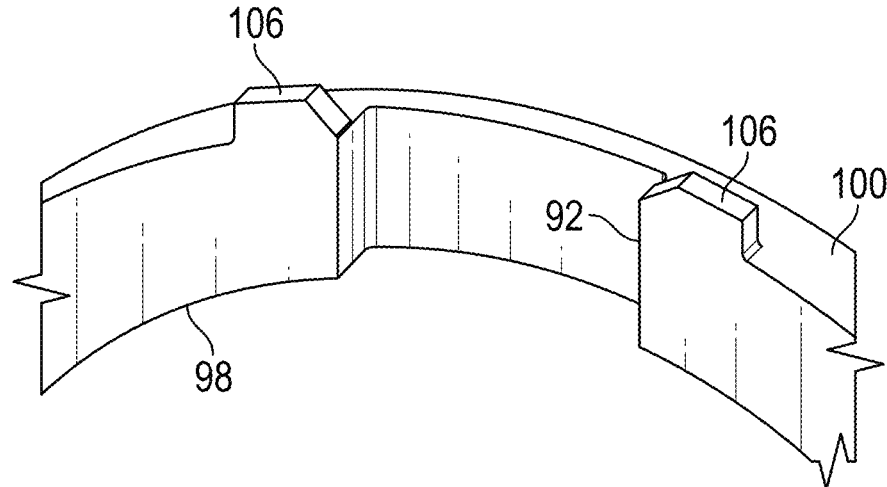
Figure 7C:
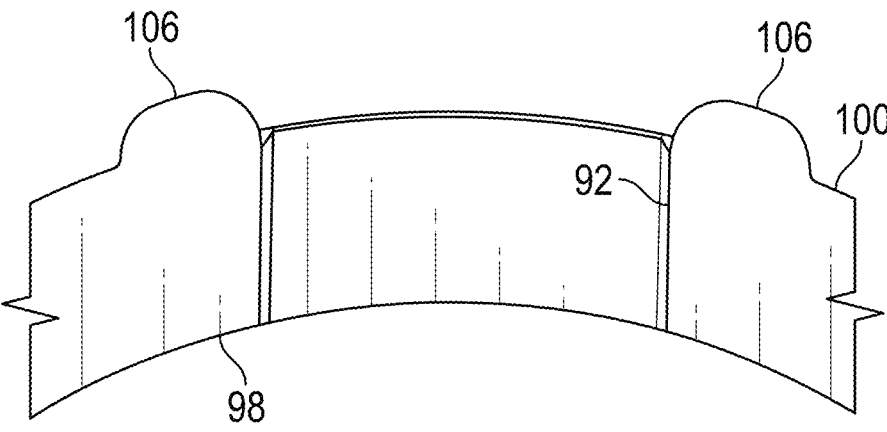
Figures 9A, 9B, 9C:
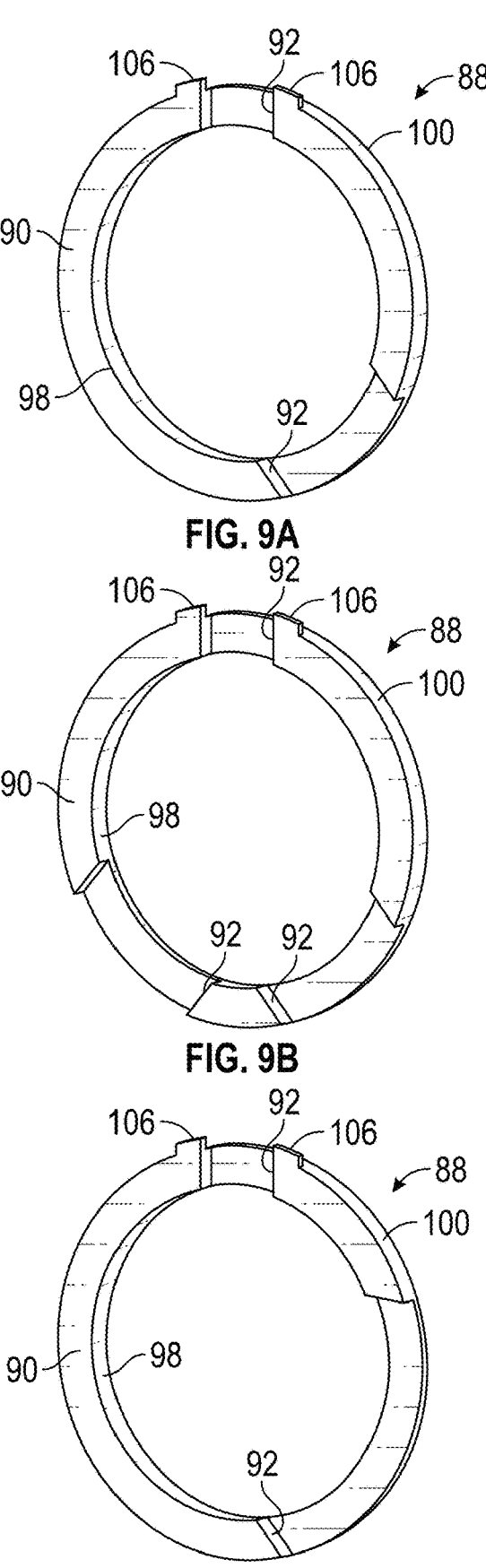

Referring now to FIGS. 7A-7C, partial views of alternative non-rotating spacers 88 in accordance with the present disclosure are illustrated. As illustrated, the shape of the lugs or tabs 106 may differ from straight to rounded, chamfer or any other depending on the matting part geometry.

FIGS. 8A-8C are partial views of alternative non-rotating spacers 88 in accordance with the present disclosure are illustrated. As illustrated in FIGS. 8A and 8B, the shape of the slot 92 may differ to optimize connection efficiency between cavities 80. For example, inner surfaces of the slot 92 may be angled. In addition, the configuration of the lugs or tabs 106 may vary. As illustrated in FIG. 8D, the number of slots 92 may differ to optimize the anti-rotating feature in relation to the mating part 70, the slots 92 may be symmetrical or not. In addition, and as illustrated in at least FIGS. 8C and 8D, a single tab or lug 106 may be used. In other words, in some embodiments the non-rotating spacer 88 may have a single tab or lug 106.

Referring now to FIGS. 9A-10B, other alternative non-rotating spacers 88 in accordance with the present disclosure are illustrated. As illustrated, the shape and number of slots 92 on the perimeter of the non-rotating spacer 88 may differ in dimensions, there may be one or more slot 92 and slots 92 may be symmetrical or asymmetrical.

As illustrated in FIG. 10B, the spacer 88 may be formed from two separate materials that are joined together. In yet another alternative embodiment, and as illustrated in FIGS. 10C and 10D, the mating part 70 and the spacer 88 may be rectangular. In the embodiment of FIGS. 10C and 10D, all of the other features or alternatives are contemplated except the spacer 88 and at least the first inner periphery 72 are rectangular.

As such, various embodiments of the present disclosure provide a spacer that defines an axial position between the parts in two cavities. Those cavities must remain fluidly connected and the spacer must be prevented against rotation in order to maintain this fluid connection as well as prevent surface wear due to spacer rotation. Accordingly, the spacer 88 of the present disclosure allows the spacer 88 to be assembled into the mating part 70 with loose fit, without the need for any special tools and the spacer 88 is configured with anti-rotation features (e.g., tab(s) or lugs 106) and cavities or slots 92 that allow for the aforementioned fluid communication. In other words, and in one non-limiting embodiment, the spacer 88 can be manually inserted into the mating part 70 by a person or robot with any special tools and/or excessive force.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly, comprising:
a non-rotating spacer; and
a mating part, the mating part configured to keep a first part axially spaced from a contact surface of the mating part, the mating part comprising:

a first inner periphery and a second inner periphery, the first inner periphery having a larger perimeter than the second inner periphery, the contact surface extending radially inward from the first inner periphery and transitions into the second inner periphery;

a pair of openings located in the first inner periphery;

the non-rotating spacer configured to be inserted into the first inner periphery, the non-rotating spacer comprising:

a perimeter of material having a first contact surface and a second contact surface, the first contact surface being opposite to the second contact surface, the perimeter of material also having an inner surface and an outer surface;

a pair of slots located in the first contact surface, the pair of slots extending from the inner surface to the outer surface, the pair of slots do not extend through to the second contact surface such that the pair of slots are defined by three surfaces of the perimeter of material; and a pair of lugs, one of the pair of lugs disposed on one side of one of the pair of slots and the other one of the pair of lugs disposed on another side of the one of the pair of slots, the pair of lugs protruding radially outward from the outer surface; and wherein the pair of lugs are received within one of the pair of openings when the non-rotating spacer is located within the first inner periphery, and the pair of slots provide fluid communication from the inner surface to the pair of openings when the non-rotating spacer is located within the first inner periphery, and the pair of lugs prevent rotation of the non-rotating spacer when the non-rotating spacer is located within the first inner periphery.

2. The assembly as in claim 1, wherein a recess extends from the contact surface to the second inner periphery.

3. The assembly as in claim 1, wherein the pair of openings are elongated oval openings.

4. The assembly as in claim 1, wherein the pair of openings are located 180 degrees from each other and/or the mating part is configured for use in a gas turbine engine.

5. The assembly as in claim 1, wherein the pair of openings extend partially into the contact surface of the mating part to create a recess in the contact surface of the mating part.

6. The assembly as in claim 1, wherein the perimeter of material is a ring of material and the outer surface of the ring of material has a diameter that is less than a diameter of the first inner periphery such that the non-rotating spacer is inserted into the first inner periphery and the first contact surface of the non-rotating spacer makes contact with the contact surface of the mating part when the non-rotating spacer is inserted into the first inner periphery.

7. The assembly as in claim 1, wherein the pair of slots each have a width, the width of each one of the pair of slots being equal.

8. The assembly as in claim 1, further comprising a third slot in the first contact surface, the third slot extending from the inner surface to the outer surface, the third slot does not extend through to the second contact surface such that the third slot is defined by three surfaces of the perimeter of material.

9. The assembly as in claim 1, wherein the first inner periphery and the perimeter of material of the non-rotating spacer are rectangular or square.

10. The assembly as in claim 9, wherein the pair of lugs are disposed on opposite sides of the one of the pair of slots.

* * * * *